(12) United States Patent
Camarena

(10) Patent No.: US 6,811,403 B1
(45) Date of Patent: Nov. 2, 2004

(54) METHOD FOR BIODEGRADABLE MATERIAL HAVING WATER AND URIC ACID ACTIVATED COLOR IMAGES

(76) Inventor: Bridgette H Camarena, 4364 N. Cedar Ave., Fresno, CA (US) 96826

( * ) Notice: Subject to any disclaimer, the term of this patent is extended or adjusted under 35 U.S.C. 154(b) by 0 days.

(21) Appl. No.: 10/436,405

(22) Filed: May 12, 2003

(51) Int. Cl.[7] .................................. G09B 19/00
(52) U.S. Cl. .......................... 434/258; 434/247
(58) Field of Search .................. 434/247, 236, 434/258, 260; 4/661, 300.3; D23/310

(56) References Cited

U.S. PATENT DOCUMENTS

| | | | | |
|---|---|---|---|---|
| 5,017,226 A | * | 5/1991 | Kulisz | 106/31.17 |
| 5,031,253 A | * | 7/1991 | Brendlinger | 4/300.3 |
| 5,117,512 A | * | 6/1992 | Bressler | 4/300.3 |
| 5,117,515 A | * | 6/1992 | White et al. | 4/661 |
| 5,363,516 A | * | 11/1994 | Butts | 4/661 |
| 5,809,590 A | * | 9/1998 | Williams et al. | 4/661 |
| D428,976 S | * | 8/2000 | Mattera | D23/310 |
| 6,183,850 B1 | * | 2/2001 | Lauer | 428/304.4 |
| 6,416,853 B1 | * | 7/2002 | Nakashima et al. | 428/313.9 |
| 6,594,927 B2 | * | 7/2003 | Witkowski | 40/310 |
| 6,648,650 B1 | * | 11/2003 | Fiorella | 434/247 |

FOREIGN PATENT DOCUMENTS

| | | | | |
|---|---|---|---|---|
| GB | 2363397 | * | 12/2001 | A47K/17/00 |
| WO | WO 99/49770 | * | 10/1999 | A47K/11/10 |

* cited by examiner

*Primary Examiner*—Kurt Fernstrom
(74) *Attorney, Agent, or Firm*—Michael I Kroll

(57) ABSTRACT

The present invention 10 discloses a chemically treated biodegradable material 32 having an image impregnated therein that is only viewable by absorption of uric acid. A mature image 26 is produced on the biodegradable material by reaction with urine 36 to become visible and is designed to encourage infants 12 to use the potty 14 when having to urinate. The present invention 10 reveals a dark outline or sketch of the actual image when reacting to water 38 only. This way the child 12 is still encouraged to make the effort to get to the potty. However, only when uric acid or urine 36 is detected by the present invention will bright and vibrant colors be revealed giving the potty training tot 12 an even greater surprise and even greater reason for wanting to see the images which form when he potties.

8 Claims, 13 Drawing Sheets

US 6,811,403 B1

METHOD FOR BIODEGRADABLE MATERIAL HAVING WATER AND URIC ACID ACTIVATED COLOR IMAGES

BACKGROUND OF THE INVENTION

1. Field of the Invention

The present invention relates generally to color changing and more specifically to a chemically treated biodegradable material having an image impregnated therein that is only viewable by absorption of uric acid. The image produced on the biodegradable material reacting with urine to become visible is designed to encourage infants to use the potty when having to urinate.

The invention when reacting to water alone reveals a dark outline or sketch of the actual image. This way the child is still encouraged to make the effort to get to the potty. Only when uric acid or urine is detected by the invention will bright and vibrant colors be revealed giving the potty training tot an even greater surprise and even bigger reason for wanting to see the images.

2. Description of the Prior Art

There are other toddler potty training devices. Typical of these is U.S. Pat. No. 456,047 issued to Meyer on Jul. 14, 1891.

Another patent was issued to Guthmann on Aug. 29, 1934 as U.S. Pat. No. 2,083,372. Yet another U.S. Pat. No. 3,725,104 was issued to Fraik, et al., on Apr. 3, 1973 and still yet another was issued on Jul. 17, 1973 to Duskin as U.S. Pat. No. 3,745,672.

Another patent was issued to Sokol et al., on Feb. 12, 1980 as U.S. Pat. No. 4,188,431. Yet another U.S. Pat. No. 4,631,203 was issued to Schaefer et al on Dec. 23, 1986. Another was issued to Walker, Jr. et al., on Nov. 15, 1988 as U.S. Pat. No. 4,784,876 and still yet another was issued on May 21, 1991 to Cellists as U.S. Pat. No. 5,017,226.

Another patent was issued to Kawashima on Jun. 1, 1993 as U.S. Pat. No. 5,215,956. Yet another U.S. Pat. No. 5,310,627 was issued to Hire et al on May 10, 1994. Another was issued to Miller et al., on Apr. 2, 1996 as U.S. Pat. No. 5,503,665

U.S. Pat. No. 456,047

Inventor: Otto Meyer

Issued: Jul. 14, 1891

The process for producing lines, words, and figures on paper or any other suitable material, which consists in drawing, writing, or printing them with solutions of phenolphthalein, coroline, or any other indicator of alkaline reaction and subsequently subjecting the same to the reaction of an alkali to develop the lines m words, or figures, substantially as described.

U.S. Pat. No. 2,083,372

Inventor: Walter S. Guthmann

Issued: Jun. 8, 1937

A sympathetic ink, normally invisible when applies to dry paper of sized or unsized type but adapted to be made visible when the paper is wetted, said ink comprising a material affecting the water permeability of the paper, and a solvent therefor having a vapor pressure between approximately 0.1 and 7.5 millimeters of material constituting on the order of 0.25% to 5% of the U.S. Pat. No. 3,725,104

Inventor: Robert D. Fraik

Issued: Apr. 3, 1973

The discolored paper-based feedback systems employ thermograph processes which transfer a pattern of vaporized reactant material selected from the group consisting of: dithooxamide, the N,N-distributed derivatives of dithooxamide, and iron-complexing compound having a benzene ring and at least two hydroxyl groups substituted in adjacent positions on said ring to treated or untreated paper-like receptor sheet to form a storable latent image, i.e. a hidden entry, on the sheet. The latent image can be developed weeks or months later with a coreactant salt.

U.S. Pat. No. 3,745,672

Inventor: Robert B. Duskin

Issued: Jul. 17, 1973

Colorless painting apparatus having chemically treated sheets which are provided with a color forming reactant, and a supply of colorless paints each of which chemically reacts with the absorbent color forming reactant of each treated sheet for imparting different colored illustrations upon the sheet.

U.S. Pat. No. 4,188,431

Inventor: Phillip E Sokol et al

Issued: Feb. 12, 1980

This invention relates to alkali developable, paper-based systems printed with invisible phenolphthalein inks and made reusable through many development cycles by employing critical concentrations of dye reactants in conjunction with a paper having a defined water soluble acidity-alkalinity.

U.S. Pat. No. 4,631,203

Inventor: Rolf Schaefe, et al

Issued: Dec. 23, 1986

A sharp imaging, non-smearing system for latent imaging and subsequent visual development of printed text or the like is provided which can be used on a variety of substrates (e.g., paper, metal, cloth, synthetic resins) and is extremely stable and easy to use. The system involves first imaging a substrate with an invisible ink containing a dissociable transition metal salt such as $CuSO_4$, with subsequent application of a liquid developer containing a solubilized color precursor such as thiooxalic amide which complexes with dissociated transition metal ion to give a sharp, virtually instantaneously developing, long lasting color. Depending upon the metal salt selected, different colors can be obtained upon development. The system of the invention can be used in a variety of contexts, such as in self-testing materials or novelty items.

U.S. Pat. No. 4,784,876

Inventor: Haywood A. Walker Jr. et al

Issued: Nov. 15, 1988

A sharp imaging, non-smearing system for latent imaging and subsequent visual development of printed text or the like is provided which can be used on a variety of substrates (e.g. paper, metal, cloth, synthetic resins) and is extremely stable and easy to use. The system involves first imaging a substrate with an invisible non-blurring, non-sublimating ink containing a dissociable nickel salt such as $NiSO_4$, with subsequent application of a liquid developer containing a dispersed color precursor such as dimethylglyoxime which reacts with nickel ion to give a sharp, long lasting red color. The developer preferably includes an accelerator such as NaOH for accelerating the above reaction so as to make it virtually instantaneous. The system of the present invention can be used in a variety of contexts, such as in self-testing materials or novelty items.

U.S. Pat. No. 5,017,226

Inventor: Michael Kulisz

Issued: May 21, 1991

Disclosed is a system for developing latent images on alkali-based or acid-based paper stock which has been marked with a water-soluble oxidizing agent to form a concealed image. In the system, a marking composition is applied to said paper stock which comprises (a) A water-soluble iodide, (b) Acetic acid, (c) A water-soluble reducing agent, and (d) Water. Preferably, the reducing agent is ascorbic acid and preferably the marking composition also comprises a water-soluble dye.

U.S. Pat. No. 5,215,956

Inventor: Kiyoharu Kawashima

Issued: Jun. 1, 1993

In the color changing print of this invention, plural areas are printed by using plural types of color changing inks which develop into different colors from the substantially invisible colorless state by reaction with a color changing agent. By the emergence of print from colorlessness and by giving changes in the appearing colors, unexpectedness and entertainingness are provided so that an attractive education may be realized.

U.S. Pat. No. 5,310,627

Inventor: Suzan J. Hirz et al

Issued: May 10, 1994

A method for locally enhancing the contrast of a yellow image, which method comprises providing a yellow image on a white background, said images comprising yellow areas and white areas, said yellow areas and white areas exhibiting pH levels which differ by at least 0.5 in an aqueous environment, applying too at least a portion of a said yellow image a solution of a pH color changing dye which will change color to a color other than yellow when coated on one of said yellow areas or white areas and not change color when coated on the other of said yellow areas or white areas, thereby forming a colored image duplicating the yellow image in areas where the solution has been applied, said colored image having a visually better contrast than said a yellow image.

U.S. Pat. No. 5,503,665

Inventor: Richard E. Miller

Issued: Apr. 2, 1996

A coloring system is provided in which an undercolor composition is applied to a substrate to thereby leave a colorless mark. The undercolor composition is then written over with an overcolor composition, thereby causing the undercolor mark to become colored. The overcolor composition may itself contain a colorant. In one embodiment, the color-changing effects are accomplished by employing a dye that is colorless in the presence of high pH and/or a reducing agent, but that becomes colored as the pH is lowered, as the undercolor colorant. In a second embodiment, the color-changing effects are accomplished by employing a dye that is colorless at low pH, but that becomes colored as the pH is raised, as the undercolor colorant.

While these chemical treatments may be suitable for the purposes for which they were designed, they would not be as suitable for the purposes of the present invention, as hereinafter described.

SUMMARY OF THE PRESENT INVENTION

The present invention discloses a chemically treated biodegradable material having an image impregnated therein that is only viewable by absorption of uric acid. A mature image is produced on the biodegradable material by reaction with urine to become visible and is designed to encourage infants to use the potty when having to urinate. The present invention reveals a dark outline or sketch of the actual image when reacting to water only. This way the child is still encouraged to make the effort to get to the potty. However, only when uric acid or urine is detected by the present invention will bright and vibrant colors be revealed giving the potty training tot an even greater surprise and even greater reason for wanting to see the images which form when he potties.

A primary object of the present invention is to provide an aid for toilet training infants.

Another object of the present invention is to provide a toilet training aid requiring the infant to urinate to activate the aid to its full potential.

Yet another object of the present invention is to provide a toilet training aid whose reward like qualities are controlled by the infant.

Still yet another object of the present invention is to provide a behavioral modification stimulus that will encourage the infant to repeat the act through positive reinforcement.

Another object of the present invention is to provide a positive reinforcement stimulus for infant urination comprised of a biodegradable material.

Yet another object of the present invention is to provide a positive reinforcement stimulus device comprised of a biodegradable material having an image imprinted thereon, along with colored dyes reactive to only uric acids or urine.

Still yet another object of the present invention is to provide a positive reinforcement stimulus device comprised of a biodegradable material having an image imprinted thereon that is not viewable until acted upon by a catalyst such as water. Water, as a reactant will give the invention its basic outline of a character or image making up a black and white or black and clear image in the toilet.

Another object of the present invention is to provide a positive reinforcement stimulus device comprised of a biodegradable material having an image that requires a catalyst in the form of uric acid to view the image fully and vividly colored-in right before their eyes requiring a colored dye or dyes reactive only to uric acid or urine.

Additional objects of the present invention will appear as the description proceeds.

The present invention overcomes the shortcomings of the prior art by providing a chemically treated biodegradable material having an image impregnated therein that is only viewable when the material is placed in water in a toilet bowl after the child says he or she does not want to urinate. By absorption of an acid base substance such as urine the basic outline of the image will begin to reveal vibrant colors and additional details. The child is encouraged to urinate into a toilet or potty trainer whereupon the caregiver drops the biodegradable material having the invisible image therein whereby said outline of image will become viewable to the child once wet and if the child has urinated. The real reward to child is when vibrant colors fill the outlined image. The object of the invention being to encourage the child to use the toilet whether successfully urinating or not. The child still sees toilet training as something of a reward as opposed to disappointment when failing to actually urinate.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments since practitioners skilled in the art will recognize numerous other embodiments as well. For a definition of the complete scope of the invention, the reader is directed to the appended claims.

Figure 1:
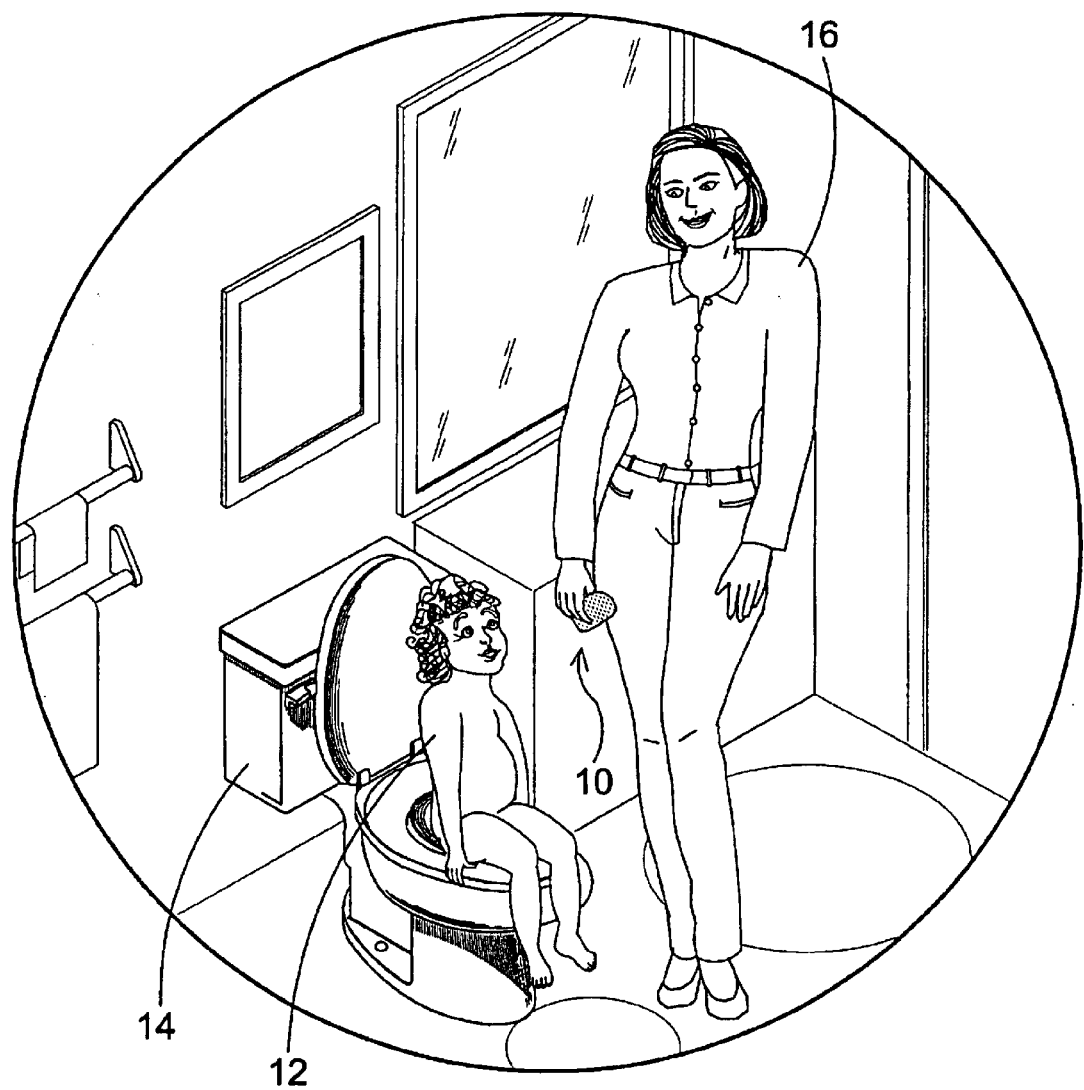
FIG. 1 is an illustrative view of the present invention in use.

Turning to FIG. 1, shown therein is an illustrative view of the present invention 10 in use. Shown is a toddler 12 being toilet 14 trained by an attendant 16 wherein the present invention 10 provides reward or amusement for the child upon urination. The present invention 10 provides a biodegradable material chemically treated with an image whereby exposure to water displays a dark outline of an image that has previously been impregnated into the biodegradable material. Exposure to urine will enhance the image that was impregnated into the biodegradable material thereby displaying a full image in vibrant colors therefore rewarding the child 12 for urinating in the toilet 14.

Figure 2:
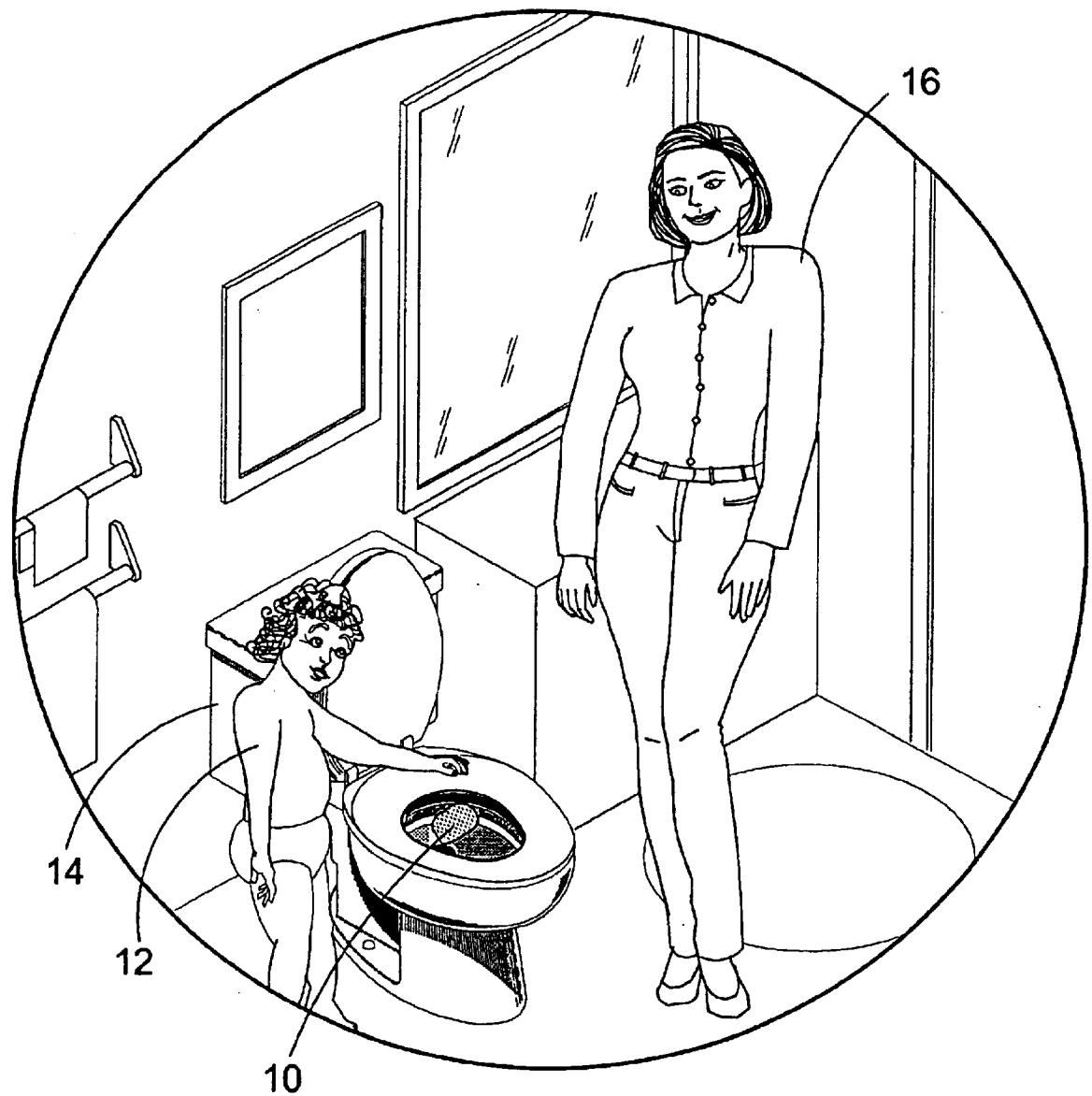
FIG. 2 is an illustrative view of the present invention in use.

Turning to FIG. 2, shown therein is an illustrative view of the present invention 10 in use by an attending adult 16. The present invention 10 is a chemically treated biodegradable material having an image impregnated therein that is only viewable by absorption of an acid base substance such as urine. Used in potty training the child 12 is encouraged to urinate into a toilet 14 or potty trainer whereupon the biodegradable material having the invisible image therein will become viewable in vibrant colors to the child if the child has urinated therefore making the child smile happily and encouraging the child to urinate. The object of the invention being to encourage the child to use the toilet.

Figure 3:
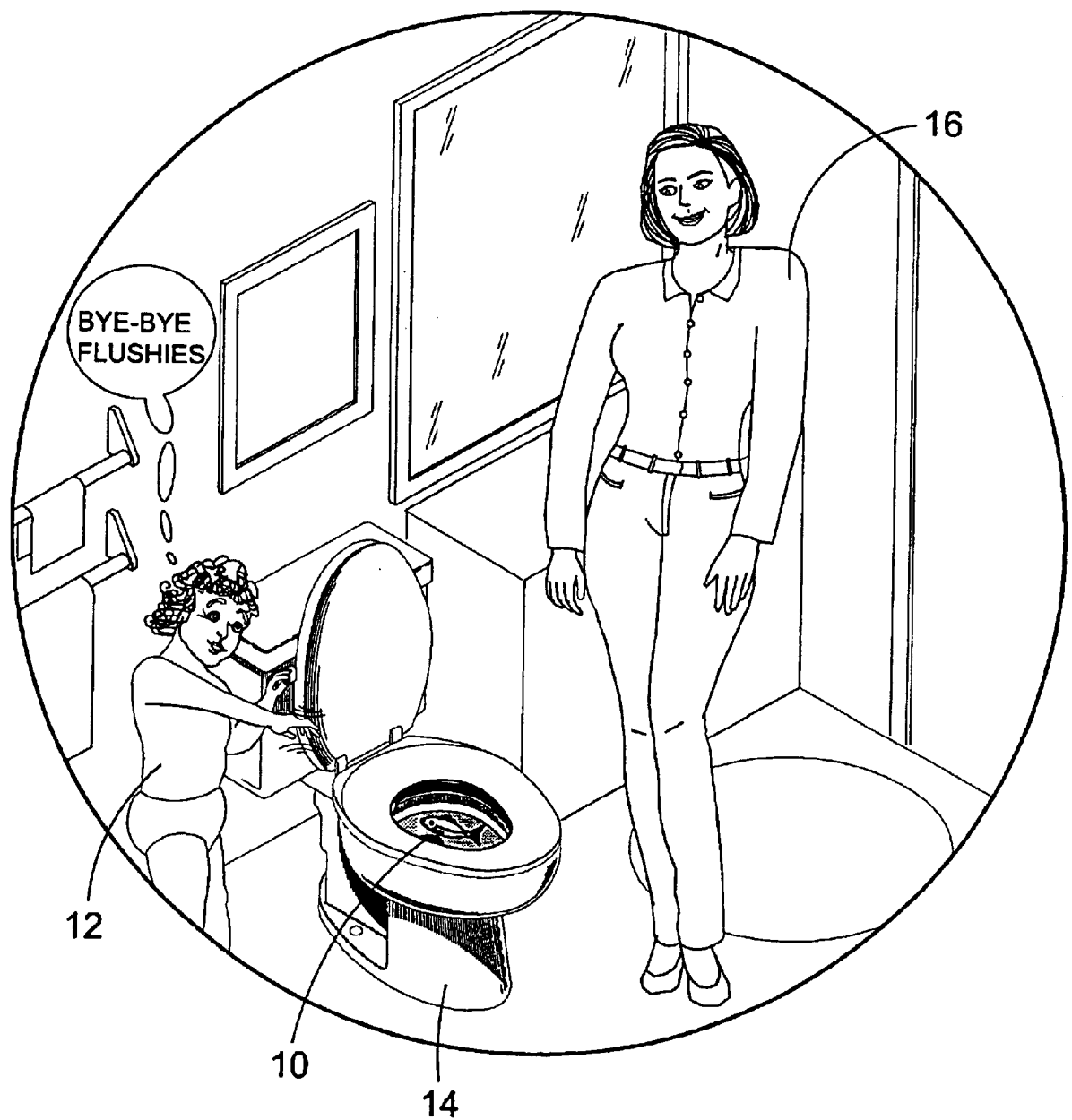
FIG. 3 is an illustrative view of the present invention in use.

Turning to FIG. 3, shown therein is an illustrative view of the present invention 10 in use by an attending adult 16. The present invention 10 is a chemically treated biodegradable material having an image impregnated therein that is only viewable by absorption of water and acid base substance such as urine. The child 12 is thrilled and waving bye-bye to the flushies wherein the urine has activated the impregnated image displaying the vibrant colors therein. Toilet 14 is also shown.

Figure 4:
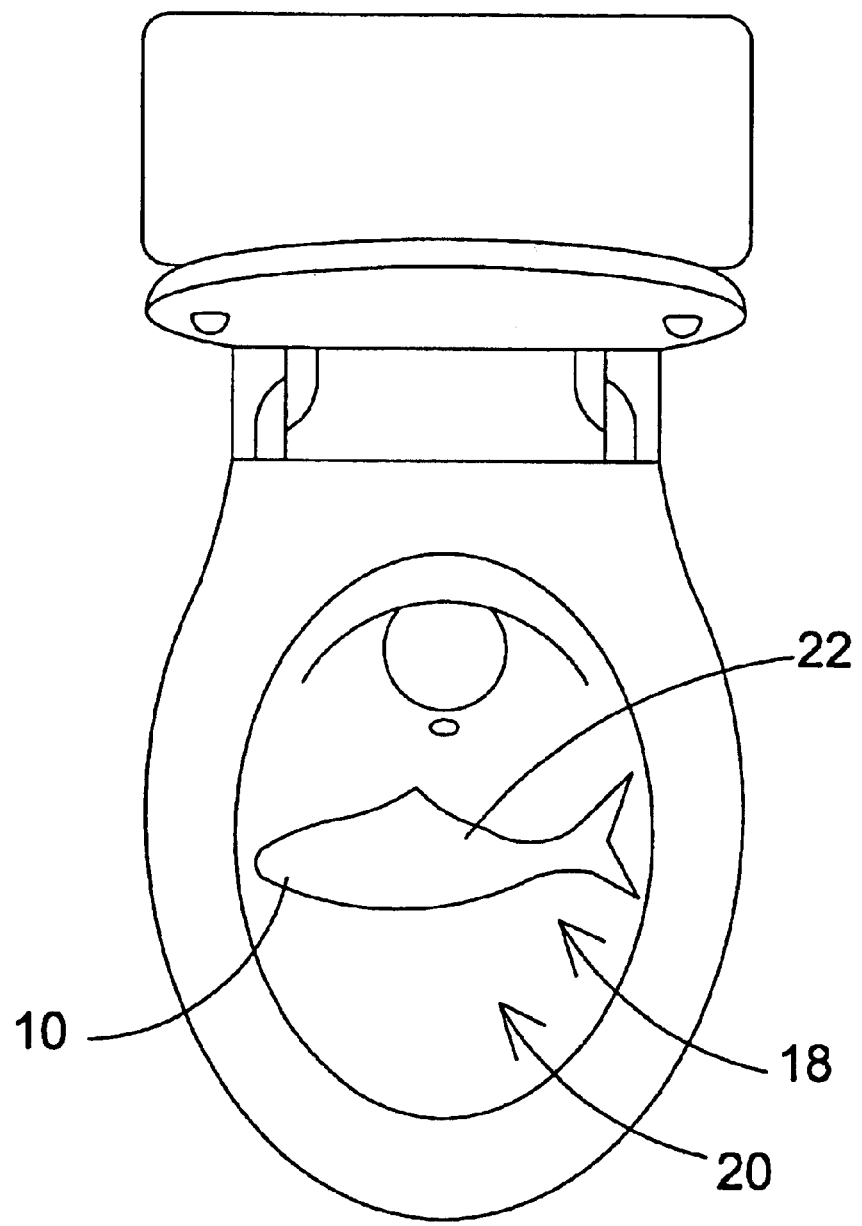
FIG. 4 is a top view of the present invention in use.

Turning to FIG. 4, shown therein is a top view of the present invention 10 in use. Shown is the present invention 10 in a toilet bowl 18 of water 20 having just been placed therein by the caregiver or toddler where a vague or faint outline of an image 22 has appeared after being placed in water 20 only. The biodegradable material has been chemically treated to react with water 20 to expose a predetermined image 22. It will be explained later that after activation in uric acid a vibrant colored image appears which amuses the child thus entertaining the toddler thus promoting a positive reinforcement when the child urinates in the toilet or potty trainer.

Figure 5:
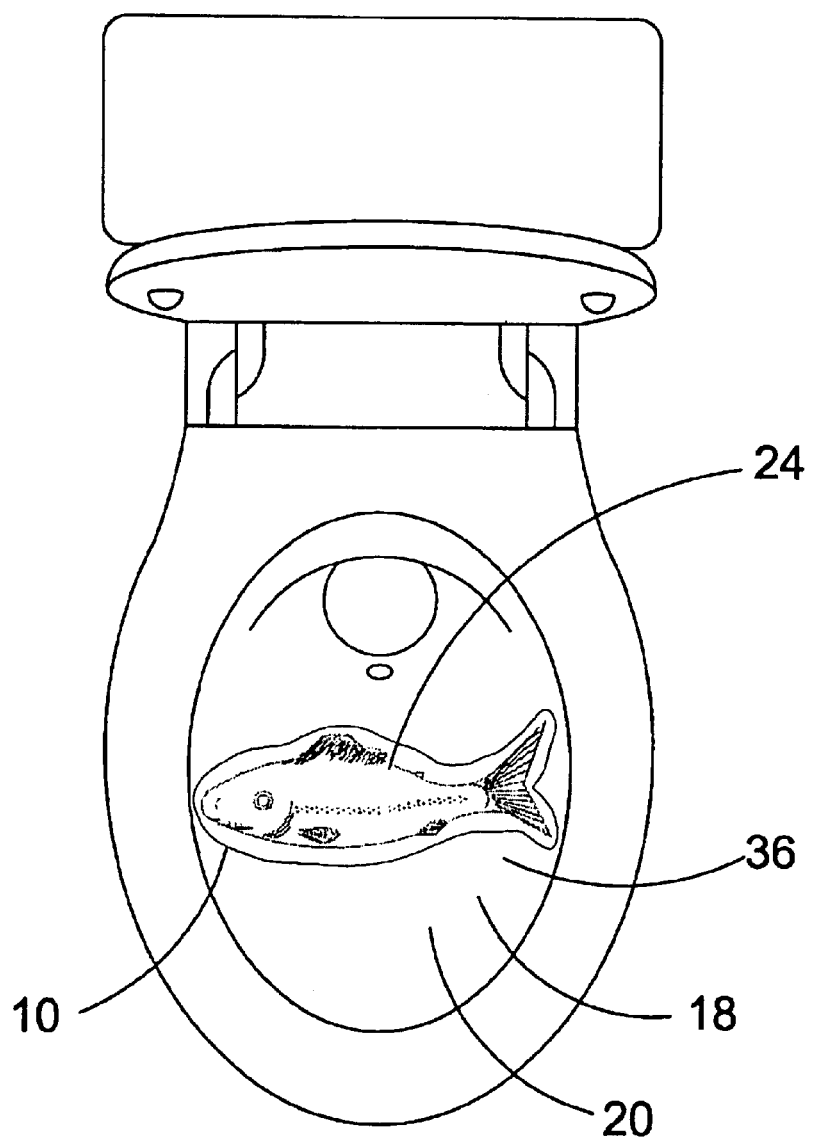
FIG. 5 is a top view of the present invention in use.

Turning to FIG. 5, shown therein is a top view of the present invention 10 in use. Shown is the present invention 10 after having been placed in the toilet bowl 18 or potty trainer whereupon water 20 and urine or uric acid 36 being present begins exposing and transforming the image 24, i.e., an early stage image, which could be of anything including words such as their name or an image of an object with a name or logo from a favorite TV program or super hero, etc. The objective being that the chemical treatment on the biodegradable material reacts with the toddler's urine displaying the vibrant colored image.

Figure 6:
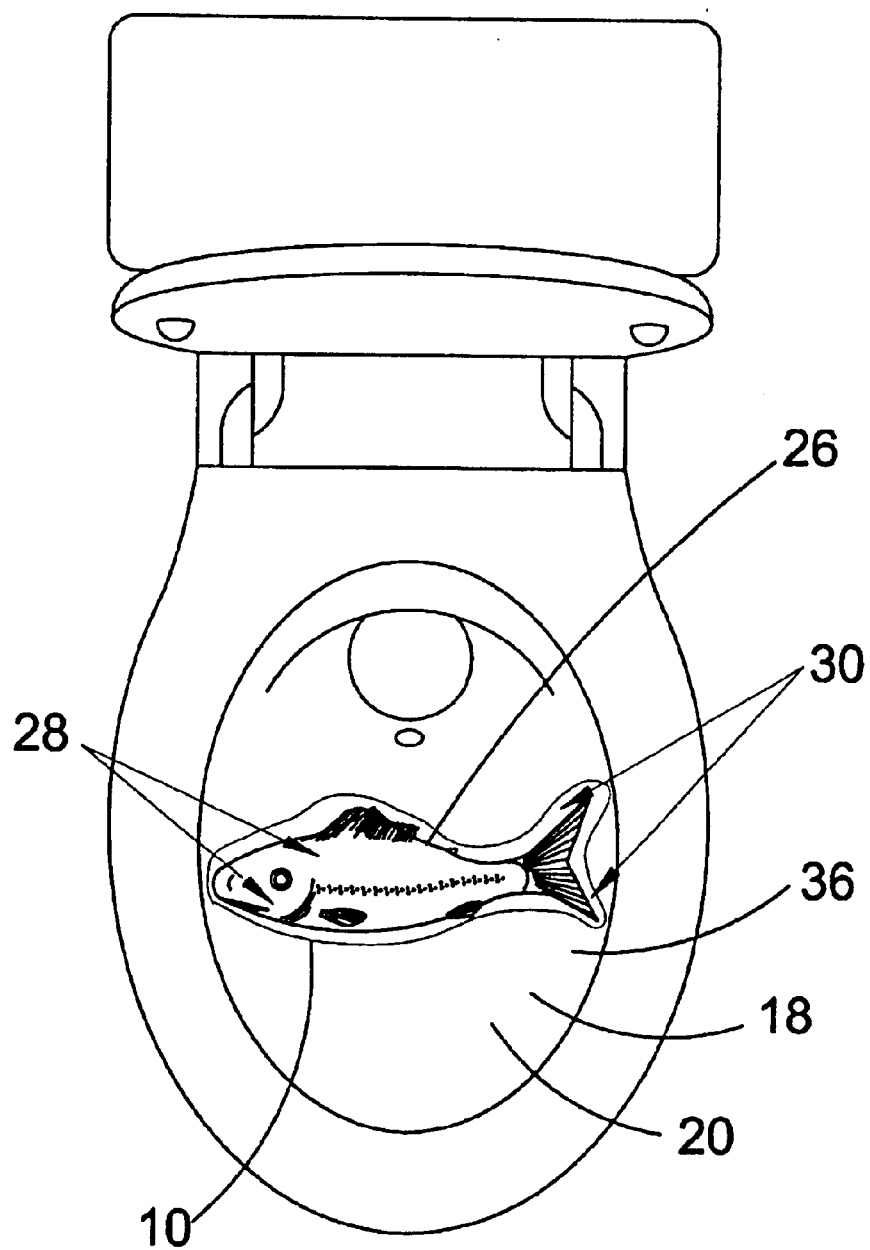
FIG. 6 is a top view of the present invention in use.

Turning to FIG. 6, shown therein is a top view of the present invention 10 in use. Shown is the present invention 10 having been placed in the toilet bowl 18 or potty trainer with water 20 and urine or uric acid 36. The image 26, i.e., the mature or full image as shown here, which could be of anything including words such as a name or an image of an object with a name or logo from a favorite TV program or super hero, etc. The objective being that the chemical treatment on the biodegradable material reacts with the toddler's urine displaying the impregnated mature or full image 26 magically coming to life showing colors, e.g., vibrant blues 28 and pastel greens 30.

Figure 7:
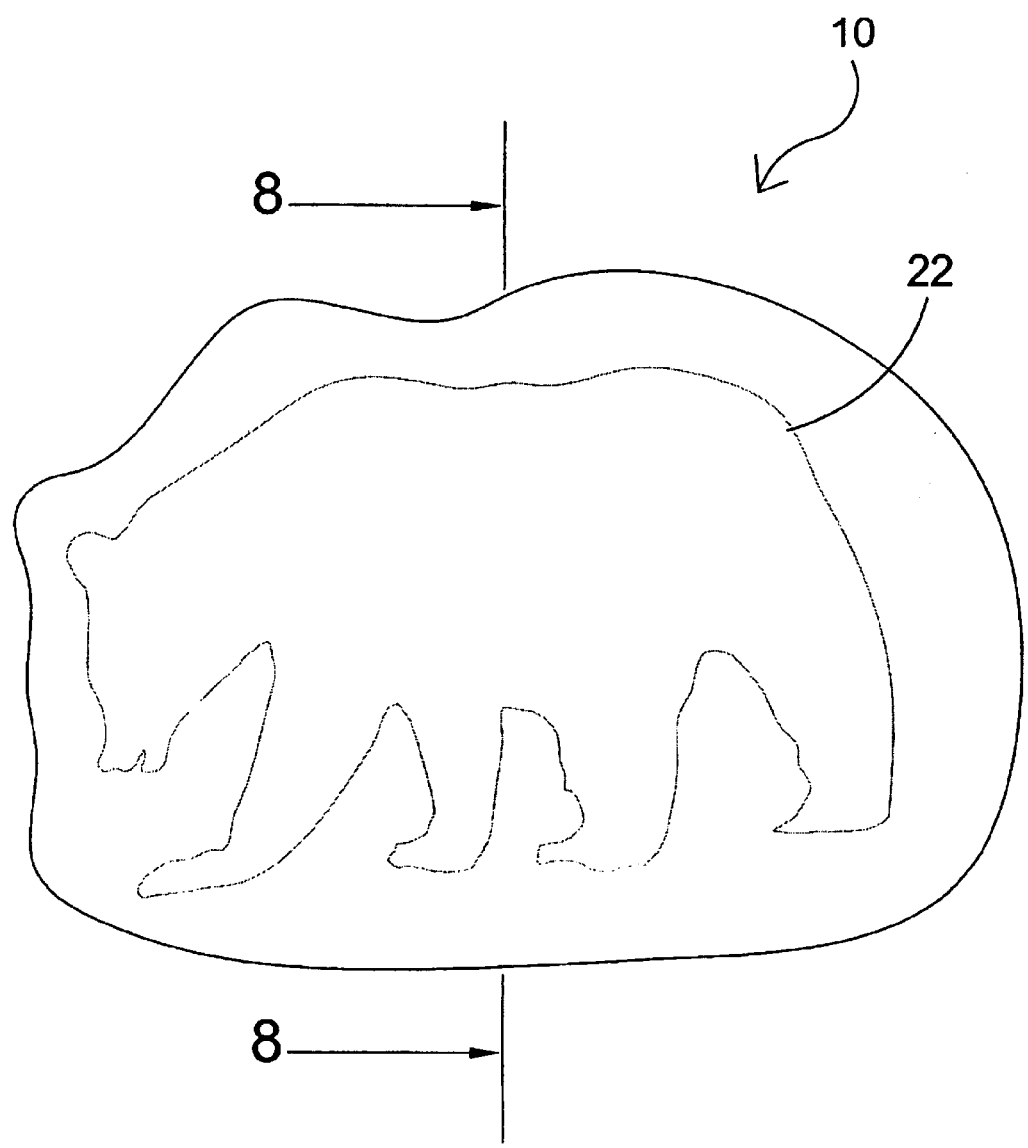
FIG. 7 is a top view of the present invention.

Turning to FIG. 7, shown therein is a top view of the present invention 10. Shown is one example of the present invention's impregnated chemical faint image 22 outline on the biodegradable material. The image 22 can be of any object, letters or art work applied to a biodegradable material with the purpose being that the image is not completely visible until exposed to uric acid.

Figure 8:
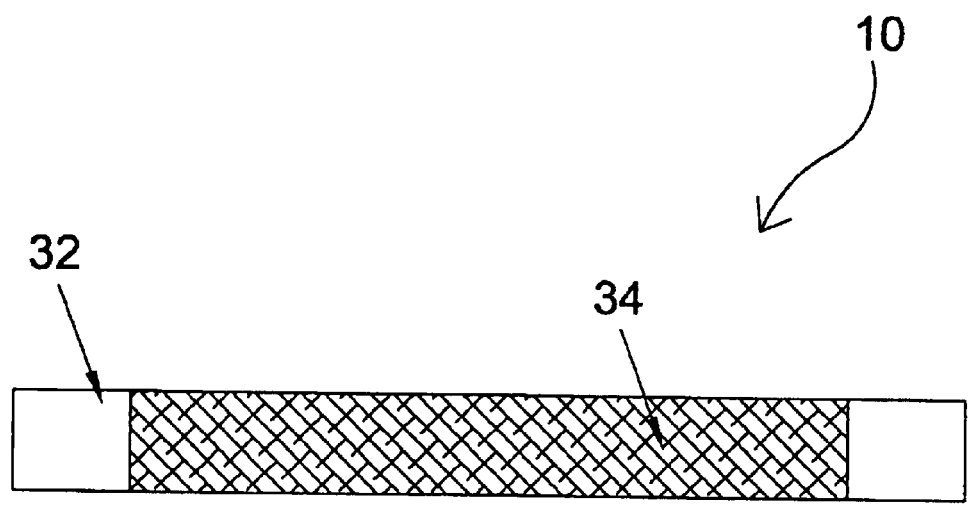
FIG. 8 is a sectional view of the present invention.

Turning to FIG. 8, shown therein is a sectional view of the present invention 10. Shown is a sectional view of the chemically treated biodegradable material 32 having an image impregnated therein that is clearly viewable by absorption of an acid base substance such as urine. The first image could be of an outline of something that the child could guess at the image or any number of solid images, words, letters, art work, etc. The purpose being to have a biodegradable material 32 having a chemically treated area 34 on the material 32 that will become clearly visible composed of a vibrantly colored image only when mixed with uric acid. This will reinforce the desire within the child to learn muscle control over their bladder to be able to see the positive aspect of urinating in the toilet or potty trainer instead of their diaper.

Figure 9:
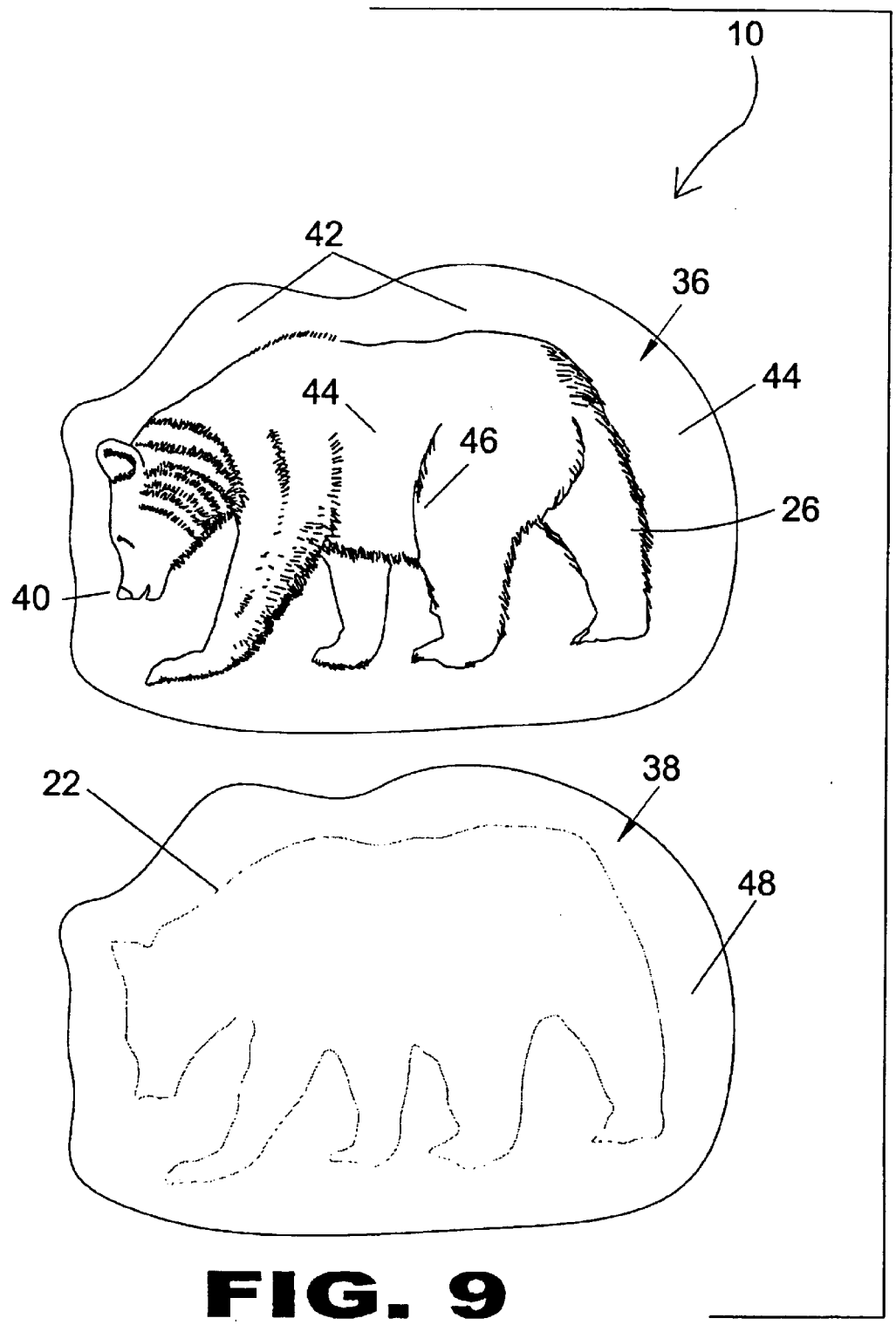
FIG. 9 is a top view of one example of the present invention.

Turning to FIG. 9, shown therein is a top view of one example of the present invention 10. Shown is the present invention 10 with the chemical application on the biodegradable material activated by urine 36 displaying a mature image 26 of a bear and below showing the biodegradable material wet by water 38 showing a vague or faint image 22 before exposure of the chemically reactive image having uric acid as the catalyst. Shown are the various colors including pink 40, blue 42, teal green 44, golden brown 44, medium brown 46, and white or clear 48.

Figure 10:
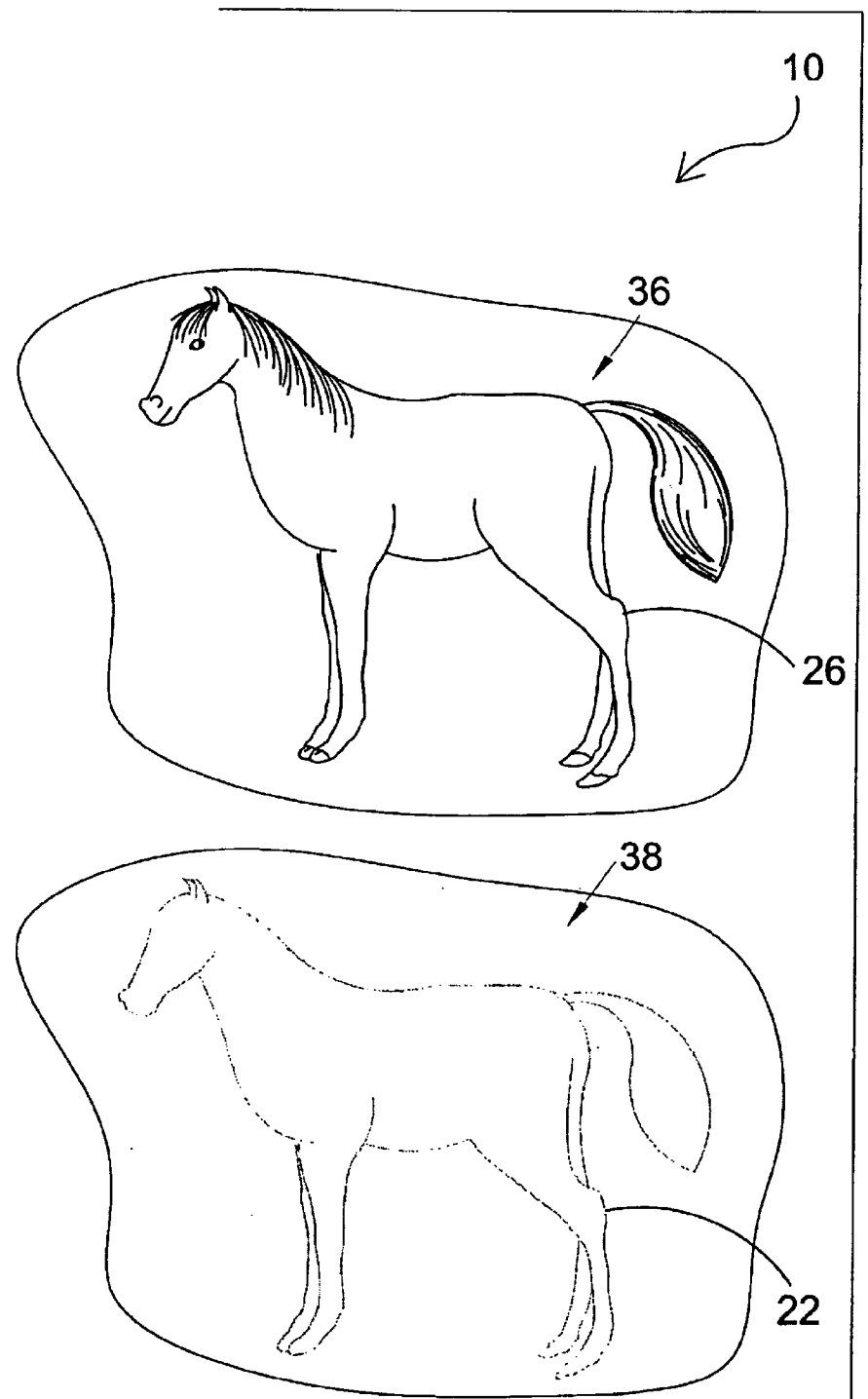
FIG. 10 is a top view of another example of the present invention.

Turning to FIG. 10, shown therein is a top view of another example of the present invention 10. Shown is the present invention 10 illustrating another before and after view of the chemical application on the biodegradable material activated by urine 36 or uric acid which displays a mature image of a horse 26 and below showing the biodegradable material in water 38 only showing the vague colorless outline of an image 22.

Figure 11:
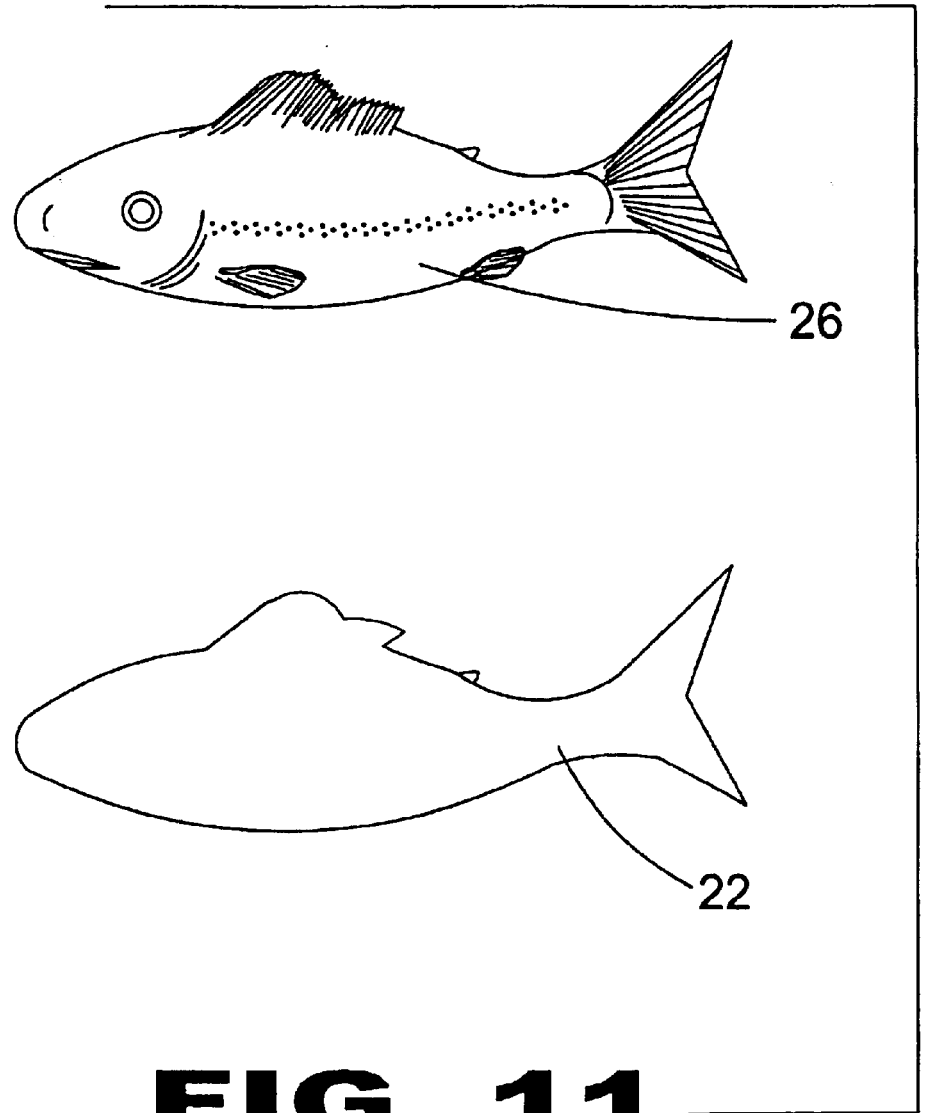
FIG. 11 is a top view of another example of the present invention.

Turning to FIG. 11, shown therein is a top view of another example of the images of the present invention. Shown is the present invention illustrating another before and after view of the chemical application on the biodegradable material activated by urine which displays a mature image 26 of a fish and below showing the biodegradable material being in the form of a fish 22 without any detail.

Figure 12:
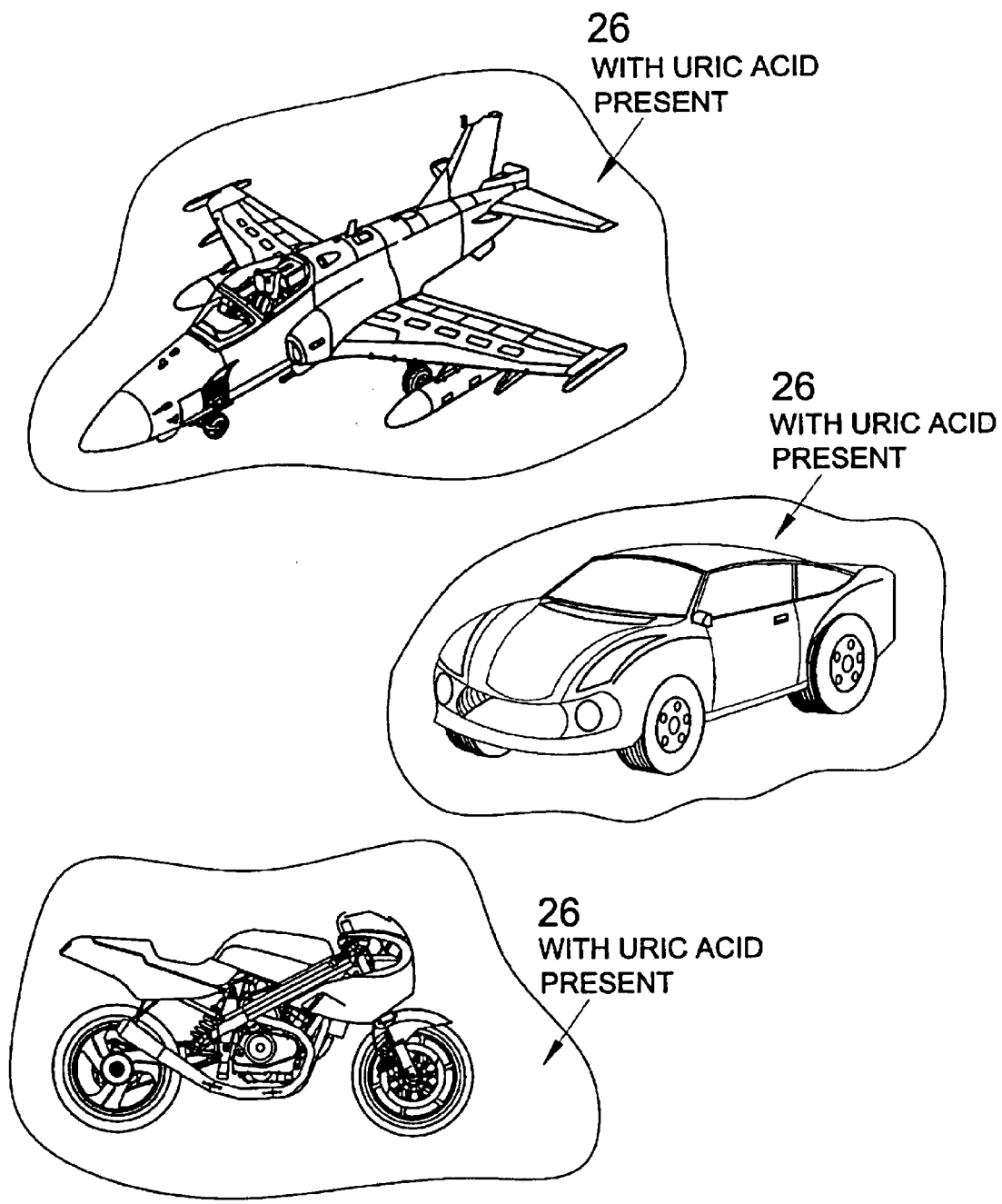
FIG. 12 is a top view of additional illustrations of the present invention.

Turning to FIG. 12, shown therein is a top view of additional illustrations of the images of the present invention. The present invention is a biodegradable material having an image thereon that is only fully viewable upon activation by the presence of urine. The mature images 26 that develop in the presence of uric acid and depicted in FIG. 12 are representative of a plurality of graphic images that are possible and are not a limitation of the present invention to any specific image.

Figure 13:
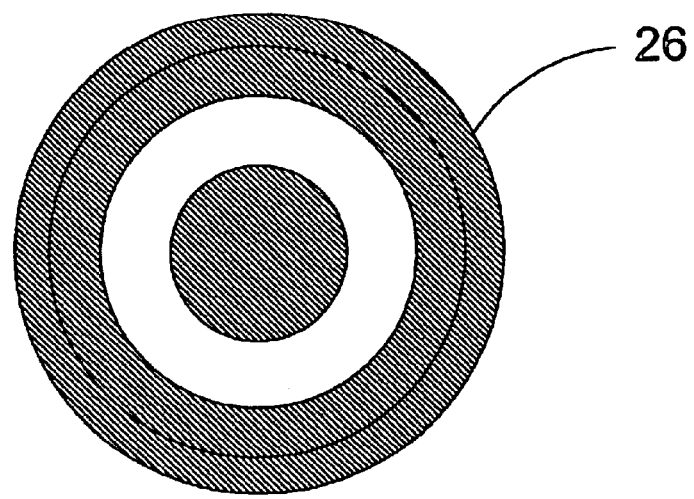
FIG. 13 is a top view of an additional illustration of the present invention.
Figure 13:
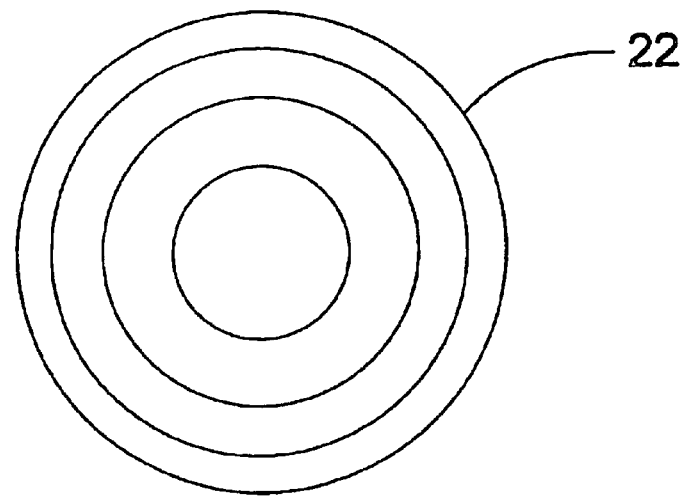

Turning to FIG. 13, shown therein is a top view of an additional illustration of the images of the present invention.

The present invention is a biodegradable material having an image thereon that is only viewable upon activation by the presence of water and urine. The image depicted is a "bowls eye" that can assist male potty trainers in the aiming of discharged urine. Shown is a vague image 22 which forms in the presence of water only and a mature image 26 which forms in the presence of urine or uric acid.

In summary, the present invention discloses a a method for toilet training a child having the following steps: a) providing a piece of biodegradable material sized to be placed in a toilet bowl; b) imprinting an image onto the piece of material, wherein the imprinted image comprises a chemical substance which substance causes the imprinted image to be invisible to the human eye so long as the chemical substance is dry, wherein the imprinted image becomes visible to the human eye upon reaction of the chemical substance with water or with a mixture of water and uric acid; c) placing the piece of material in a toilet bowl of water to react the chemical substance with water to form an outline of the image; and, d) allowing an outline of the image to form so as to encourage the child to use the toilet when urinating. Then, in order to form a full image, having the child urinate in the toilet bowl to react the chemical substance with a mixture of water and uric acid to form the full image; and, allowing a full image to form so as to encourage the child to use the toilet when urinating. A full image may comprise a single color or any color from the range of the visible color spectrum.

LIST OF REFERENCE NUMERALS

With regard to reference numerals used, the following numbering is used throughout the drawings.

10 present invention
12 toddler
14 toilet
16 attendant
18 toilet bowl
20 water
22 vague image
24 early stage image
26 mature image
28 vibrant blue color
30 pastel green color
32 biodegradable material
34 chemically treated area
36 uric acid or urine
38 water
40 pink color
42 blue color
44 golden brown
46 medium brown
48 white or clear

I claim:

1. A method for toilet training a child, comprising:
   a) providing a piece of biodegradable material sized to be placed in a toilet bowl;
   b) imprinting an image onto the piece of material, wherein the imprinted image comprises a chemical substance which substance causes the imprinted image to be invisible to the human eye so long as the chemical substance is dry, wherein an outline of the imprinted image becomes visible to the human eye upon reaction of the chemical substance with water and forms a full image in color when in contact with uric acid;
   c) placing the piece of material in a toilet bowl of water to react the chemical substance with water to form an outline of the image, d) allowing an outline of the image to form so as to encourage the child to use the toilet when urinating; and e) having the child urinate in the toilet bowl to react the chemical substance with a mixture of water and uric acid to form the full image in color thereby encouraging the child to use the toilet when urinating.

2. The method of claim 1, further comprising the step of imprinting an image of a fish onto the piece of material.

3. The method of claim 1, further comprising the step of imprinting an image of a bear onto the piece of material.

4. The method of claim 1, further comprising the step of imprinting an image of a horse onto the piece of material.

5. The method of claim 4, further comprising the step of imprinting an image of a airplane onto the piece of material.

6. The method of claim 5, further comprising the step of imprinting an image of a automobile onto the piece of material.

7. The method of claim 6, further comprising the step of imprinting an image of a motorcycle onto the piece of material.

8. The method of claim 7, further comprising the step of imprinting an image of a bullseye onto the piece of material.

\* \* \* \* \*